US012195822B2

(12) United States Patent
Gan et al.

(10) Patent No.: US 12,195,822 B2
(45) Date of Patent: Jan. 14, 2025

(54) COOPERATIVE EMISSION REDUCTION METHOD FOR SINTERING USING ENERGY-CARRYING COMPOSITE GAS MEDIUM

(71) Applicants: CENTRAL SOUTH UNIVERSITY, Changsha (CN); ZHONGYE CHANGTIAN INTERNATIONAL ENGINEERING CO., LTD., Changsha (CN)

(72) Inventors: Min Gan, Changsha (CN); Xiaohui Fan, Changsha (CN); Zhiyun Ji, Changsha (CN); Guojing Wang, Changsha (CN); Zhian Zhou, Changsha (CN); Haoyu Zhou, Changsha (CN); Zhaocai Wang, Changsha (CN); Xuling Chen, Changsha (CN); Xiaoxian Huang, Changsha (CN); Yuanjie Zhao, Changsha (CN)

(73) Assignees: CENTRAL SOUTH UNIVERSITY, Changsha (CN); ZHONGYE CHANGTIAN INTERNATIONAL ENGINEERING CO., LTD., Changsha (CN)

( * ) Notice: Subject to any disclaimer, the term of this patent is extended or adjusted under 35 U.S.C. 154(b) by 789 days.

(21) Appl. No.: 17/418,276

(22) PCT Filed: Jul. 29, 2020

(86) PCT No.: PCT/CN2020/105364

§ 371 (c)(1),
(2) Date: Jun. 25, 2021

(87) PCT Pub. No.: WO2021/139136

PCT Pub. Date: Jul. 15, 2021

(65) Prior Publication Data

US 2022/0213565 A1 Jul. 7, 2022

(30) Foreign Application Priority Data

Jan. 9, 2020 (CN) ........................ 202010020485.6

(51) Int. Cl.
*C22B 1/16* (2006.01)
*C21B 5/00* (2006.01)
(Continued)

(52) U.S. Cl.
CPC ................ *C22B 1/16* (2013.01); *C21B 5/008* (2013.01); *F27D 17/00* (2013.01); *F27D 2019/0034* (2013.01); *F27M 2003/04* (2013.01)

(58) Field of Classification Search
CPC .............. F27M 2003/04; C21B 13/004; C21B 13/0053; C21B 13/0073; C21B 2100/26;
(Continued)

(56) References Cited

U.S. PATENT DOCUMENTS 4,536,211 A 8/1985 Futakuchi et al.
2003/0110891 A1 6/2003 Vanderheyden et al.

FOREIGN PATENT DOCUMENTS

CN 104034175 A 9/2014
CN 106595327 A 4/2017
(Continued)

OTHER PUBLICATIONS

NPL: on-line translation of CN 110564952 A, listed in IDS filed on Sep. 6, 2021, Dec. 2019 (Year: 2019).*
(Continued)

*Primary Examiner* — Jie Yang
(74) *Attorney, Agent, or Firm* — Bayramoglu Law Offices LLC

(57) ABSTRACT

A cooperative emission reduction method for sintering using an energy-carrying composite gas is disclosed. A surface of
(Continued)

a sintered material is divided into an ignition section, a heat preservation section, a middle section, a flue gas heating section, and a machine tail section from a machine head to a machine tail of a sintering machine; according to flue gas components, temperature characteristics, and heat requirements of different sections, a hot exhaust gas is introduced to the ignition section for ignition, a hot exhaust gas is introduced to the heat preservation section and a hydrogen-rich gas is cascadingly sprayed synchronously, cascaded spraying of water vapor is coupled based on spraying of a hydrogen-rich gas in the middle section, and the high-temperature flue gas in the machine tail section and the flue gas in the ignition section and/or the heat preservation section are circulated to the heating section.

7 Claims, 1 Drawing Sheet

(51) Int. Cl.
*F27D 17/00* (2006.01)
*F27D 19/00* (2006.01)

(58) Field of Classification Search
CPC ....... C21B 2100/80; C21B 5/008; C22B 1/16; C22B 1/20; C22B 1/245; F27D 17/00; F27D 2019/0034
See application file for complete search history.

(56) References Cited

FOREIGN PATENT DOCUMENTS

| | | | |
|---|---|---|---|
| CN | 207066129 | U | 3/2018 |
| CN | 109668444 | A | 4/2019 |
| CN | 110564952 | A | 12/2019 |
| CN | 110592370 | A | 12/2019 |

OTHER PUBLICATIONS

Pei Yuandong, et al., Research on spraying steam on surface of sintering material bed to increase fuel combustion efficiency, Sintering and Pelletizing, 2016, pp. 16-20, 52, vol. 41 No. 6.

Xiaohui Fan, et al., Elimination Behaviors of NOx in the Sintering Process with Flue Gas Recirculation, ISIJ International, 2015, pp. 2074-2081, vol. 55 No. 10.

Yu Heng , Cooperative Optimization of Flue Gas Recycling in Iron Ore Sintering for Energy Saving and Emissions Reduction with Process Control of SO2 and NOx, A Dissertation in Ferrous Metallurgy, 2016, pp. 1-141.

* cited by examiner

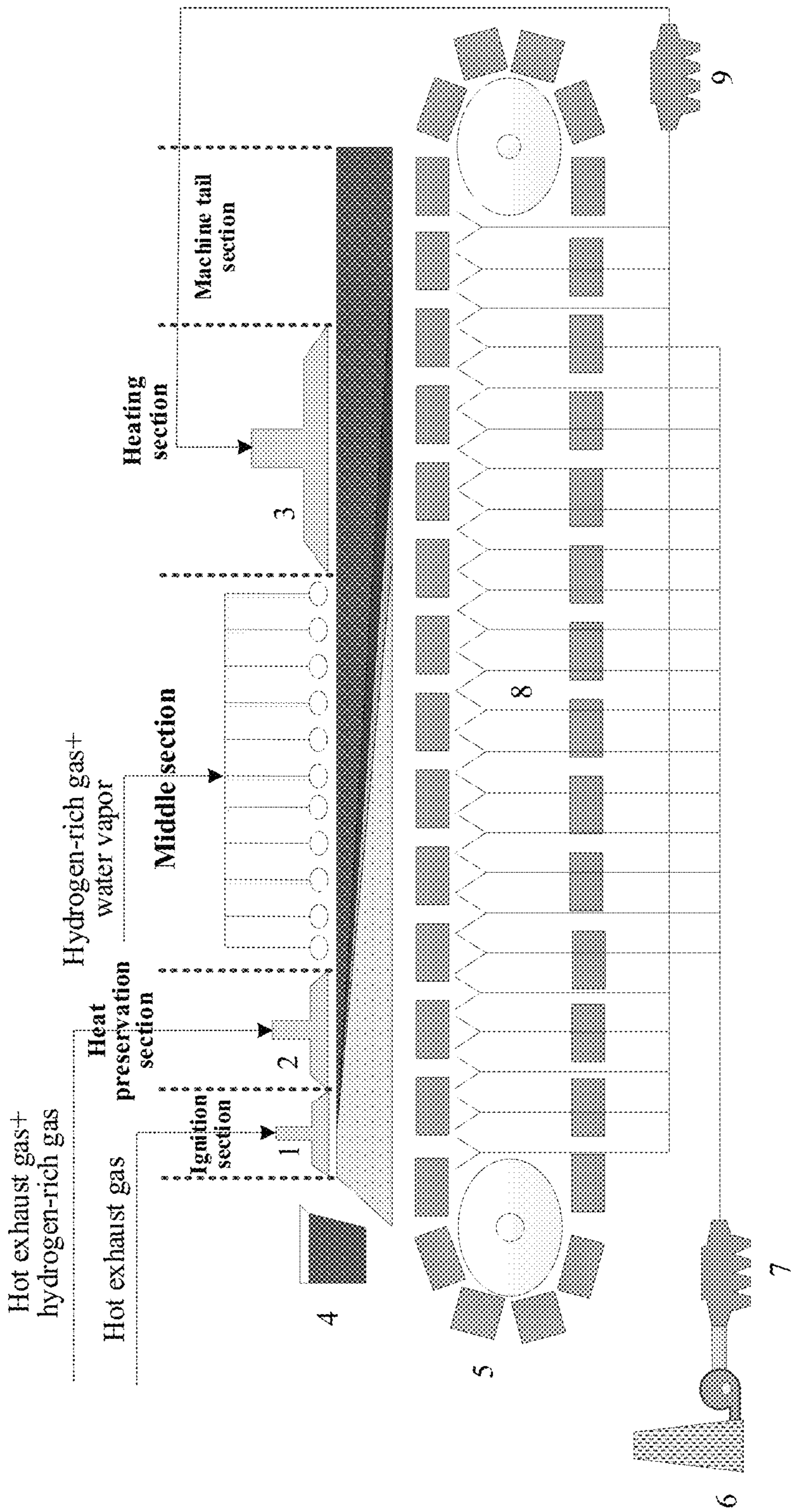
Hot exhaust gas+
hydrogen-rich gas
Hot exhaust gas
Ignition section
Heat preservation section
Hydrogen-rich gas+
water vapor
Middle section
Heating section
Machine tail section
1
2
3
4
5
6
7
8
9

COOPERATIVE EMISSION REDUCTION METHOD FOR SINTERING USING ENERGY-CARRYING COMPOSITE GAS MEDIUM

CROSS REFERENCE TO THE RELATED APPLICATIONS

This application is the national phase entry of International Application No. PCT/CN2020/105364, filed on Jul. 29, 2020, which is based upon and claims priority to Chinese Patent Application No. 202010020485.6, filed on Jan. 9, 2020, the entire contents of which are incorporated herein by reference.

TECHNICAL FIELD

The present invention relates to a method for sintering, in particular, to a cooperative emission reduction method for sintering using an energy-carrying composite gas medium, and specifically, to a method of dividing a surface of a sintered material into sections, and introducing different energy-carrying gases according to characteristics and heat requirements of different sections to replace conventional air, to achieve energy conservation and emission reduction. The present invention belongs to the field of steel metallurgy sintering technologies.

BACKGROUND

High energy consumption and high pollution are important factors restricting sustainable development of conventional industries, especially in the steel industry. Iron ore sintering, a front procedure of the steel industry, poses severe challenges to green manufacturing of the steel industry due to its high energy consumption and heavy pollution load. In a conventional sintering process, solid fossil fuels such as coke and anthracite are generally used as heat sources, and the proportion thereof is as high as 75-80% of energy consumption of the sintering. The consumption of fossil energy is an important source of producing $CO_2$ and $SO_x$ and a main source of producing NO in a sintering flue gas. In addition, due to incomplete combustion of solid fuels, 10-15% of carbon is converted into CO, resulting in energy waste and environmental pollution. Therefore, reducing the consumption of solid fossil fuels, controlling combustion atmosphere, inhibiting production of pollutants, and effectively degrading pollutants are main methods of pollutant control in the sintering process.

In recent years, the large-scale level of sintering equipment has been continuously improved, and energy conservation measures such as raw fuel optimization, high-basicity sintering, burden distribution and segregation, high material layer sintering, low-temperature sintering, pelletized sintering, fuel distribution optimization, hot air ignition to assist combustion for sintering, and mixture preheating, have been widely used to effectively reduce the consumption level of solid fuels in sintering. To further effectively reduce the consumption level of solid fuels, enterprises and research institutes carry out the development of new technologies in optimizing an energy supply structure. Biomass has low nitrogen and low sulfur and can implement carbon cycling, and is therefore regarded as a clean fuel. Biomass is used in the sintering process to partially replace solid fossil fuels, so that the emission of $NO_x$, $SO_x$, and $CO_x$. In a hot air sintering technology, a hot exhaust gas in cooled sintered ore is used as an energy-carrying heat source. The hot exhaust gas is extracted by a high-temperature fan and introduced to a hot air hood behind an ignition furnace for sintering, thereby compensating for heat deficiency in an upper layer of a sintered material and achieving energy conservation and consumption reduction. The gas fuel injection technology is a sintering technology in which a gas fuel is added to middle and upper portions of a material layer based on the reduction of the proportion of solid fuels. This technology can adequately optimize a thermal state of the material layer, improve ore-forming conditions, and implement the reduction of solid fuel consumption in both fuel structure optimization and quality improvement.

For controlling sintering combustion atmosphere, inhibiting production of pollutants, and effectively degrading pollutants, a water vapor injection process and a flue gas circulation process are representatives of the corresponding technologies.

Shougang Jingtang shows on site that (Study on spraying vapor on a surface of a sintered material to improve fuel combustion efficiency[J], Yuandong PEI) spraying water vapor with a suitable concentration in a middle section of a layer of a sintered material can improve combustion conditions, increase combustion efficiency, and effectively reduce CO emission. However, during actual application, when an injection position of water vapor is close to the front, a red-hot layer is adversely affected, and when an injection position is close to the rear, a sintered ore belt is adversely affected. As a result, the energy conservation and emission reduction effects of water vapor injection are greatly limited.

To recover heat in a sintering flue gas and cooperatively consider the production and emission of flue gas pollutants, at the end of the 20th century, foreign countries began to develop technology in returning a part of a flue gas produced during the sintering to a sintering machine for recycling. At present, there are five conventional industrialized flue gas circulation processes at home and abroad, including the regional exhaust gas circulation process developed by Nippon Steel Corporation, the EOS process developed by Umuiden in the Netherlands, the LEEP process developed by HKM in Germany, the EPOSINT process developed by Voestalpine Company, and the sintering exhaust gas residual heat circulation process developed by Baosteel in China. During application, in addition to the reduction of flue gas emission, a high-temperature flue gas enters the material layer to bring more heat, and the proportion of fuels may be appropriately reduced, to further facilitate the reduction of pollutant emission. In addition, literature studies have shown that: in a circulation process of a flue gas, NO can be reduced, and can suppress the conversion of the element N in a solid fuel into $NO_x$ (Elimination Behaviors of $NO_x$ in the Sintering Process with Flue Gas Recirculation[J], Xiaohui FAN), while dioxin in the flue gas can be thermally decomposed when passing through a combustion layer, and secondary combustion of CO occurs (Cooperative Optimization of Process Control and Energy Conservation and Emission Reduction of $SO_2$ and $NO_x$ in flue gas circulation for iron ore sintering [D], Heng YU). However, for the one-section circulation of the EOS process, the two-section circulation of the LEEP process and the EPOSINT process, and the three-section circulation of the regional exhaust gas circulation process and the exhaust gas residual heat circulation process, due to a low oxygen content and/or a high water content and/or a high $SO_2$ content in the circulating flue gas, the sintering process and the quality of the sintered ore are affected to varying degrees.

SUMMARY

Technical Problem

In view of deficiencies in the prior art, an objective of the present invention is to provide a method for sintering using an energy-carrying composite gas medium to replace conventional air in the prior art. The method can reduce the consumption of solid fuels to a greater extent and synchronously inhibit production of pollutants and degrade pollutants, so that the emission of a greenhouse gas $CO_2$ and pollutants such as CO, $NO_x$, $SO_x$, and dioxin can be effectively and cooperatively reduced, thereby forming a system of overall high-efficiency energy conservation and emission reduction in a sintering process.

Technical Solution

To achieve the foregoing technical objective, the present invention provides a cooperative emission reduction method for sintering using an energy-carrying composite gas medium, including: introducing energy-carrying composite gas mediums with different compositions and heats to a surface of a sintered material of different sections in a sintering machine according to different flue gas components, temperature characteristics, and heat requirements of the different sections in the sintering machine to replace conventional air for sintering, to achieve energy consumption reduction and emission reduction.

In the technical solution of the present invention, energy-carrying composite gases with different compositions and heats are introduced to a surface of a sintered material of different sections in a sintering machine to replace conventional air for sintering, to meet the requirements of the sections for gas compositions and heats, so that the objectives of the consumption reduction of solid fossil fuels to a greater extent and the inhibition of production of pollutants or the decomposition of produced pollutants can be synchronously achieved. Compared with conventional air sintering, the emission of 15-25% of $CO_2$, 40-50% of CO, 20-40% of $NO_x$, 5-20% of $SO_x$, and 50-80% of dioxin can be reduced. The energy-carrying composite gas is a gas medium that has a particular temperature and contains a plurality of components. The components include combustible components and combustion-supporting components.

In a preferred solution, the surface of a sintered material in the sintering machine is divided into an ignition section, a heat preservation section, a middle section, a flue gas heating section, and a machine tail section from a machine head to a machine tail.

In the technical solution of the present invention, the surface of a sintered material in the sintering machine is sequentially divided into five regions according to differences in flue gas components and temperature characteristics in different sections and heat requirements of a corresponding material layer. Specifically, the segments mainly include: the ignition section: an air box flue gas has a low temperature, a high oxygen content, and a low water content; the heat preservation section: an air box flue gas has a low temperature, a low $SO_2$ content, a high NOR content, a high CO content, a high water content, and a high heat requirement of the material layer; the middle section: an air box flue gas has a low temperature, a high $SO_2$, $NO_x$, and CO content, a high dioxin content, a high water content, and a medium heat requirement of the material layer; the heating section: an air box flue gas has a high temperature, a high $SO_2$ content, a high dust content, and a low heat requirement of the material layer; and the machine tail section: an air box flue gas has a high temperature, a high oxygen content, and a low water content. More specifically, the ignition section occupies a region of 1-2 air boxes of the machine head of the sintering machine. The heat preservation section at the rear of the ignition section occupies a region of ⅙-¼ of the total length of the sintering machine. The middle section is a region from the end of heat preservation to the start of flue gas heating up (occupying ⅓-5/12 of the total length of the sintering machine). The flue gas heating section is a region from the start of flue gas heating up to the flue gas reaching the highest temperature. The machine tail section is a region of 2-3 air boxes at the tail of the sintering machine.

In a preferred solution, different energy-carrying composite gas mediums are introduced to different sections of a surface of a sintered material according to different flue gas components, temperature characteristics, and heat requirements of the different sections, to achieve the optimal sintering state in the sections, so that energy conservation and emission reduction reach the optimal level at the same time. Specifically, a hot exhaust gas is introduced to the surface of a sintered material in the ignition section for ignition; a composite gas of a hot exhaust gas and a hydrogen-rich gas is introduced to the surface of a sintered material in the heat preservation section; a composite gas of a hydrogen-rich gas and water vapor is introduced to the surface of a sintered material in the middle section; and a high-temperature flue gas of the machine tail section and a flue gas of the ignition section and/or the heat preservation section are introduced to the surface of a sintered material in the flue gas heating section.

In a more preferred solution, a hot exhaust gas with a temperature of 250-350° C. and an oxygen content (content in volume percent) of no less than 20% is introduced to the ignition section for ignition. A theoretical combustion temperature can be effectively increased by using a hot exhaust gas with a high oxygen content and a relatively high temperature, and the impact of the quality deterioration of sintered ore caused by insufficient ignition due to the heating value fluctuation of an ignition gas is overcome.

In a more preferred solution, a hot exhaust gas with a temperature of 200-300° C. and an oxygen content (content in volume percent) of no less than 20% is introduced to the surface of a sintered material in the heat preservation section, and a hydrogen-rich gas is sprayed in a manner of cascade spraying at the same time. The heat requirement of the cascaded upper part can be met to a greater extent under the joint action of the two energy-carrying gases, to facilitate further reduction of the consumption of solid fossil fuels. In addition, hot air can keep the surface of a sintered material at a particular temperature, so that the condensation formed by subsequent water vapor being injected on the surface of a sintered material can be prevented to a particular extent. A heat preservation cover is disposed in the heat preservation section. A hot exhaust gas is introduced to the heat preservation cover for heat preservation, and a hydrogen-rich gas is sprayed in the heat preservation cover in a manner of cascade spraying at the same time.

In a more preferred solution, a hydrogen-rich gas is sprayed on the surface of a sintered material in the middle section, and water vapor with a temperature of no less than 120° C. and a pressure of no less than 0.2 MPa is sprayed in a manner of cascade spraying at the same time, so that the characteristics of a low temperature, a high $SO_2$, $NO_x$, and CO content, a high dioxin content, and a high water content of the flue gas in the middle section are coupled. The combustion by spraying a gas above a combustion zone can effectively prevent low-temperature water vapor from directly contacting the combustion zone, to facilitate the advancement of a water vapor injection section, thereby greatly improving the combustion efficiency and reducing CO emission to a greater extent.

In a more preferred solution, a mixed gas of a high-temperature flue gas of the machine tail section and a flue gas of the ignition section and/or the heat preservation section with a temperature of no less than 120° C., an oxygen content (content in volume percent) of no less than 17%, and a $CO_2$ content and a water vapor content (content in volume percent) of no greater than 4% is introduced to the surface of a sintered material in the flue gas heating section. The characteristics of a flue gas in the flue gas heating section are a high flue gas temperature, a high $SO_2$ content, a high dust content, and a low heat requirement of the material layer. By using the flue gas circulation of the machine tail section and the ignition section or the heat preservation section, a part of the flue gas can be reused and NO and CO in the flue gas can be synchronously and effectively degraded without affecting the sintering process and the quality of sintered ore, to facilitate further reduction of the emission of the flue gas and pollutants. A circulation gas covens disposed in the flue gas heating section. The high-temperature flue gas in the machine tail section and the flue gas in the ignition section or the heat preservation section are circulated to the circulation gas cover in the heating section to ensure the temperature, the oxygen content, the $CO_2$ content, and the water vapor content of the gas that enters the material surface in the heating section. If the oxygen content is insufficient, air is added to supplement oxygen.

In a further preferred solution, a hydrogen-rich gas is sprayed on the surface of a sintered material in the heat preservation section in a manner of cascade spraying, and a concentration in volume percent of the hydrogen-rich gas uniformly decreases from 0.5-0.60% to 0.2-0.30% in a running direction of the sintering machine. The gas is cascadingly sprayed in a decreasing manner, so that the actual situation of the increasing heat requirement of the material layer from bottom to top due to the self-heat storage can be met, thereby facilitating homogeneous sintering.

In a further preferred solution, the hydrogen-rich gas injected in the heat preservation section is a hydrocarbon gas with a molecular weight of no less than 16, specifically, such as methane or ethane.

In a further preferred solution, water vapor is sprayed on the surface of a sintered material in the middle section in a manner of cascade spraying, and a concentration in volume percent of the water vapor uniformly increases from 0.3-0.4% to 0.7-0.9% in a running direction of the sintering machine. The method can overcome the reduction of the effective amount of water vapor participating in the reaction in the combustion zone due to condensation in the long flow of the water vapor. In addition, the dioxin is concentratedly released in the second half of the middle section, and the water vapor is sprayed cascadingly, so that the production and conversion of dioxin can further be suppressed. The water vapor is a common workshop water vapor, and may be water vapor generated by a residual heat recovery boiler from a self-heating power plant of a steel enterprise.

In a more preferred solution, a hydrogen-rich gas with a concentration in volume percent of 0.20-0.50% is sprayed on the surface of a sintered material in the middle section.

In a more preferred solution, the hydrogen-rich gas includes at least one of fuel gases such as a hydrocarbon gas and a hydrogen gas.

In a more preferred solution, the hot exhaust gas is a middle- or low-temperature exhaust gas produced by cooling sintered ore, or a middle- or low-temperature exhaust gas produced by combusting a blast furnace gas or a converter gas. The temperature and composition of the hot exhaust gas are common in the prior art.

In a preferred solution, after the corresponding energy-carrying composite gas mediums are introduced to each section of the surface of a sintered material, the addition amount of solid fuels in the material layer can be reduced, and the consumption amount of solid fuels can be reduced by 10-20%.

In the technical solution of the present invention, according to different flue gas components, temperature characteristics, and heat requirements in different sections for sintering, an energy-carrying composite gas medium is appropriately designed to replace conventional air for sintering, so that the gas composition of the surface of a sintered material is changed, to achieve the most ideal sintering state, thereby achieving the objective of cooperative energy consumption reduction and emission reduction. A theoretical combustion temperature can be effectively increased by introducing a hot exhaust gas to the ignition section for ignition, and the impact of the quality deterioration of sintered ore caused by insufficient ignition due to the heating value fluctuation of an ignition gas is overcome; a hot exhaust gas is introduced to the heat preservation section, a hydrogen-rich gas is cascadingly sprayed synchronously, and the heat requirement of the cascaded upper part can be met to a greater extent under the joint action of the two, to facilitate further reduction of the consumption of solid fossil fuels; cascaded spraying of water vapor is coupled based on spraying of a hydrogen-rich gas in the middle section, and the combustion of a gas above a combustion zone can effectively prevent low-temperature water vapor from directly contacting the combustion zone, to facilitate the advancement of a water vapor injection section, thereby greatly improving the combustion efficiency and reducing CO emission to a greater extent, and in addition, the dioxin is concentratedly released in the second half of the middle section, and the water vapor is sprayed cascadingly, so that the production and conversion of dioxin can further be suppressed; the high-temperature flue gas of 2-3 air boxes in the machine tail section and the flue gas in the ignition section and/or the heat preservation section are circulated to the circulation gas cover in the heating section, so that a part of the flue gas can be reused and NO and CO in the flue gas can be synchronously and effectively degraded without affecting the sintering process and the quality of sintered ore, to facilitate further reduction of the emission of the flue gas and pollutants.

Beneficial Effects

Compared with the prior art, the technical solution of the present invention has the following beneficial technical effects.

1) In the technical solution of the present invention, according to different flue gas compositions (including the characteristics of corresponding pollutant generation and emission), temperature characteristics, and heat requirements of different sections of a surface of a sintered material, corresponding combination gases such as an energy-carrying gas, a hot exhaust gas, water vapor, and a fuel gas are introduced. Through the coupling between an energy-carrying medium and a gas medium and the coupling among the sections, the optimal sintering state is achieved to implement cooperative energy conservation and emission reduction.

2) In the technical solution of the present invention, an energy-carrying composite gas medium is introduced to the surface of a sintered material to change the combustion atmosphere of the surface of a sintered material, so as to achieve flaming combustion of solid fuels, promote the fuel combustion speed and increase the heat utilization rate, and reduce the production of pollutants in the combustion process.

3) In the technical solution of the present invention, a flue gas with a high temperature, a high oxygen content, and a low water content in the tail section, a flue gas with a low temperature, a high oxygen content, and a low water content in the ignition section, and a flue gas with a low temperature, a low $SO_2$ content, a high $NO_x$ content, a high CO content, and a high water content in the heat preservation section are combined to form an energy-carrying composite gas medium with a suitable temperature and a suitable water content to be circulated to the heating section, so that a part of the flue gas can be reused and NO and CO in the flue gas can be synchronously and effectively degraded without affecting the sintering process and the quality of sintered ore, to facilitate further reduction of the emission of the flue gas and pollutants.

4) Compared with conventional sintering, by using a cooperative emission reduction technology for sintering using an energy-carrying composite gas, the emission of 15-25% of $CO_2$, 40-50% of CO, 20-40% of $NO_x$, 5-20% of $SO_x$, and 50-80% of dioxin can be reduced, so that an emission reduction effect is significant, and the difficulty of end treatment tasks is greatly reduced.

BRIEF DESCRIPTION OF THE DRAWINGS

FIG. 1 is a schematic diagram of a cooperative emission reduction method for sintering using an energy-carrying composite gas according to the present invention.

In FIG. 1: 1 represents an ignition cover; 2 represents a heat preservation cover; 3 represents a circulation gas cover; 4 represents a feeding trough; 5 represents a grate bar; 6 represents a chimney; 7 represents a dust collector I; 8 represents an air box; and 9 represents a dust collector II.

DETAILED DESCRIPTION OF THE EMBODIMENTS

The optimal embodiment for implementing the present invention

The optimal implementation of the present invention

IMPLEMENTATIONS OF THE PRESENT INVENTION

The following examples are to further illustrate the present invention, but not to limit the scope of the present invention.

Example 1

A material was prepared according to a mass ratio of 59.81% of blended iron ore, 4.42% of dolomite, 5.38% of limestone, 3.46% of quicklime, 13.85% of sintering-returned ore, 9.23% of blast furnace-returned ore, and 3.85% of coke powder (the chemical composition of the sintered ore was 56.26% of TFe, 1.80% of R, 1.80% of MgO, and 10.83% of CaO). A total area of a sintering machine was 450 $m^2$, with a total of 24 air boxes. After being uniformly mixed and granulated, the raw material was distributed on a sintering trolley, a hot exhaust gas (with a temperature of 250° C. and an $O_2$ content of 20.90%) of a ring cooler was introduced to an ignition cover of an ignition section (accounting for 2/24 of the length of the sintering machine) for hot air ignition. A hot exhaust gas (with a temperature of 200° C. and an $O_2$ content of 20.90%) was introduced to a heat preservation cover of a heat preservation section (accounting for ⅙ of the length of the sintering machine) for heat preservation, a natural gas was sprayed into the heat preservation cover cascadingly, and the concentration uniformly decreases from 0.60% to 0.3% in the length direction of the sintering machine. 0.3% of a natural gas was sprayed to a middle section (accounting for 5/12 of the length of the sintering machine), water vapor (with a temperature of 120° C. and a pressure of 0.2 MPa) was sprayed cascadingly, and the concentration uniformly increases from 0.40% to 0.90% in the length direction of the sintering machine. A flue gas was introduced from air boxes No. 23 and No. 24 in a machine tail section of the sintering machine and air boxes in the ignition section and the heat preservation section. After being dedusted by a dust collector II, the flue gas was circulated to a circulation gas cover of the heating section (air boxes No. 17 to No. 22). The flue gas that enters a material surface has a temperature of 150° C., an $O_2$ content of 17.80%, a $CO_2$ content of 3.5%, and a water vapor content of 4.0%. Compared with conventional air sintering, by using a cooperative emission reduction technology for sintering using an energy-carrying composite gas, 10.71% of coke powder, 15% of $CO_2$, 40% of CO, 30% of $NO_x$, 7% of $SO_x$, and 50% of dioxin can be reduced.

Example 2

A material was prepared according to a mass ratio of 59.81% of blended iron ore, 4.42% of dolomite, 5.38% of limestone, 3.46% of quicklime, 13.85% of sintering-returned ore, 9.23% of blast furnace-returned ore, and 3.85% of coke powder (the chemical composition of the sintered ore was 56.26% of TFe, 1.80% of R, 1.80% of MgO, and 10.83% of CaO). A total area of a sintering machine was 450 $m^2$, with a total of 24 air boxes. After being uniformly mixed and granulated, the raw material was distributed on a sintering trolley, a hot exhaust gas (with a temperature of 350° C. and an $O_2$ content of 20.0%) of a ring cooler and a blast furnace gas was introduced to an ignition cover of an ignition section (accounting for 1/24 of the length of the sintering machine) for hot air ignition. A hot exhaust gas (with a temperature of 300° C. and an $O_2$ content of 20.0%) was introduced to a heat preservation cover of a heat preservation section (accounting for ¼ of the length of the sintering machine) for heat preservation, a natural gas was sprayed into the heat preservation cover cascadingly, and the concentration uniformly decreases from 0.50% to 0.20% in the length direction of the sintering machine. 0.2% of a natural gas was sprayed to a middle section (accounting for ⅓ of the length of the sintering machine), water vapor (with a temperature of 134° C. and a pressure of 0.3 MPa) was sprayed cascadingly, and the concentration uniformly increases from 0.30% to 0.70% in the length direction of the sintering machine. A flue gas was introduced from air boxes No. 22 to No. 24 in a machine tail section of the sintering machine and air boxes in the ignition section and the heat preservation section. After being dedusted by a dust collector II, the flue gas was circulated to a circulation gas cover of the heating section (air boxes No. 16 to No. 21). The flue gas that enters a material surface has a temperature of 160° C., an $O_2$ content of 18.0%, a $CO_2$ content of 3.3%, and a water vapor content of 3.6%. Compared with conventional air sintering, by using a cooperative emission reduction technology for sintering using an energy-carrying composite gas, 10.71% of coke powder, 16% of $CO_2$, 43% of CO, 32% of $NO_x$, 8% of $SO_x$, and 55% of dioxin can be reduced.

Example 3

A material was prepared according to a mass ratio of 60.03% of blended iron ore, 4.44% of dolomite, 5.37% of limestone, 3.46% of quicklime, 13.85% of sintering-returned ore, 9.23% of blast furnace-returned ore, and 3.62% of coke powder (the chemical composition of the sintered ore was 56.29% of TFe, 1.80% of R, 1.80% of MgO, and 10.81% of CaO). A total area of a sintering machine was 450 $m^2$, with a total of 24 air boxes. After being uniformly mixed and granulated, the raw material was distributed on a sintering trolley, a hot exhaust gas (with a temperature of 300° C. and an $O_2$ content of 20.40%) of a ring cooler and a blast furnace gas was introduced to an ignition cover of an ignition section (accounting for 2/24 of the length of the sintering machine) for hot air ignition. A hot exhaust gas (with a temperature of 250° C. and an $O_2$ content of 20.40%) was introduced to a heat preservation cover of a heat preservation section (accounting for ¼ of the length of the sintering machine) for heat preservation, a natural gas was sprayed into the heat preservation cover cascadingly, and the concentration uniformly decreases from 0.60% to 0.30% in the length direction of the sintering machine. 0.50% of a mixed gas of a natural gas and a hydrogen gas (a volume ratio of 5:1) was sprayed to a middle section (accounting for ⅓ of the length of the sintering machine), water vapor (with a temperature of 144° C. and a pressure of 0.4 MPa) was sprayed cascadingly, and the concentration uniformly increases from 0.30% to 0.80% in the length direction of the sintering machine. A flue gas was introduced from air boxes No. 23 and No. 24 in a machine tail section of the sintering machine and air boxes in the ignition section. After being dedusted by a dust collector II, the flue gas was circulated to a circulation gas cover of the heating section (air boxes No. 17 to No. 22). The flue gas that enters a material surface has a temperature of 120° C., an $O_2$ content of 17.0%, a $CO_2$ content of 4%, and a water vapor content of 4%. Compared with conventional sintering, by using a cooperative emission reduction technology for sintering using an energy-carrying composite gas, 16.07% of coke powder, 20% of $CO_2$, 45% of CO, 35% of $NO_x$, 10% of $SO_x$, and 60% of dioxin can be reduced.

Comparative Example 1

A material was prepared according to a mass ratio of 59.36% of blended iron ore, 4.39% of dolomite, 5.40% of limestone, 3.46% of quicklime, 13.85% of sintering-returned ore, 9.23% of blast furnace-returned ore, and 4.31% of coke powder (the chemical composition of the sintered ore was 56.19% of TFe, 1.80% of R, 1.80% of MgO, and 10.88% of CaO). A total area of a sintering machine was 450 $m^2$, with a total of 24 air boxes. After being uniformly mixed and granulated, the raw material was distributed on a sintering trolley, and conventional air sintering was performed after conventional air ignition (an ignition cover accounting for 2/24 of the length of the sintering machine). In this case, the proportion of coke powder was 4.31%.

Comparative Example 2

A material was prepared according to a mass ratio of 59.36% of blended iron ore, 4.39% of dolomite, 5.40% of limestone, 3.46% of quicklime, 13.85% of sintering-returned ore, 9.23% of blast furnace-returned ore, and 4.31% of coke powder (the chemical composition of the sintered ore was 56.19% of TFe, 1.80% of R, 1.80% of MgO, and 10.88% of CaO). A total area of a sintering machine was 450 $m^2$, with a total of 24 air boxes. After being uniformly mixed and granulated, the raw material was distributed on a sintering trolley, a hot exhaust gas (with a temperature of 350° C. and an $O_2$ content of 20.90%) of a ring cooler was introduced to an ignition cover of an ignition section (accounting for 2/24 of the length of the sintering machine) for hot air ignition, and conventional air sintering was then performed. Compared with conventional sintering, by using hot air ignition, 0% of coke powder, 1.5% of $CO_2$, 1.5% of CO, 1.5% of $NO_x$, 0.5% of $SO_x$, and 1.5% of dioxin can be reduced.

Comparative Example 3

A material was prepared according to a mass ratio of 59.48% of blended iron ore, 4.40% of dolomite, 5.39% of limestone, 3.46% of quicklime, 13.85% of sintering-returned ore, 9.23% of blast furnace-returned ore, and 4.19% of coke powder (the chemical composition of the sintered ore was 56.21% of TFe, 1.80% of R, 1.80% of MgO, and 10.87% of CaO). A total area of a sintering machine was 450 $m^2$, with a total of 24 air boxes. After being uniformly mixed and granulated, the raw material was distributed on a sintering trolley, conventional air ignition (an ignition cover accounting for 2⁄24 of the length of the sintering machine) was used, and 0.5% of water vapor was sprayed to the middle of the sintering machine (at ⅓-⅗ of the length of the sintering machine). Compared with conventional sintering, after the water vapor was injected, 2.68% of coke powder, 4% of $CO_2$, 8% of CO, 4% of $NO_x$, 2% of $SO_x$, and 25% of dioxin can be reduced.

Comparative Example 4

A material was prepared according to a mass ratio of 59.59% of blended iron ore, 4.41% of dolomite, 5.39% of limestone, 3.46% of quicklime, 13.85% of sintering-returned ore, 9.23% of blast furnace-returned ore, and 4.08% of coke powder (the chemical composition of the sintered ore was 56.22% of TFe, 1.80% of R, 1.80% of MgO, and 10.86% of CaO). A total area of a sintering machine was 450 $m^2$, with a total of 24 air boxes. After being uniformly mixed and granulated, the raw material was distributed on a sintering trolley, conventional air ignition (an ignition cover accounting for 2⁄24 of the length of the sintering machine) was used, and 0.40% of a natural gas was sprayed to the middle and front of the sintering machine (at ⅙-½ of the length of the sintering machine). Compared with conventional sintering, after the natural gas was injected, 5.36% of coke powder, 8% of $CO_2$, 9% of CO, 13% of $NO_x$, 4% of $SO_x$, and 8% of dioxin can be reduced.

What is claimed is:

1. A cooperative emission reduction method for a sintering using an energy-carrying composite gas medium, comprising: introducing energy-carrying composite gas mediums with different compositions and heats to a surface of a sintered material of different sections in a sintering machine according to different flue gas components, temperature characteristics, and heat requirements of the different sections in the sintering machine to replace conventional air for the sintering, to achieve energy consumption reduction and emission reduction, wherein:

a first hot exhaust gas is introduced to the surface of the sintered material in the ignition section for an ignition, a composite gas of a second hot exhaust gas and a first hydrogen-rich gas is introduced to the surface of the sintered material in the heat preservation section, a composite gas of a second hydrogen-rich gas and water vapor is introduced to the surface of the sintered material in the middle section, and a high-temperature flue gas of the machine tail section and a flue gas of the ignition section and/or the heat preservation section are introduced to the surface of the sintered material in the flue gas heating section, the first hot exhaust gas with a temperature of 250-350° C. and an oxygen content of no less than 20% is introduced to the surface of the sintered material in the ignition section, the second hot exhaust gas with a temperature of 200-300° C. and an oxygen content of no less than 20% is introduced to the surface of the sintered material in the heat preservation section, and the first hydrogen-rich gas is sprayed in a manner of cascade spraying at the same time, the second hydrogen-rich gas is sprayed on the surface of the sintered material in the middle section, and the water vapor with a temperature of no less than 120° C. and a pressure of no less than 0.2 MPa is sprayed in the manner of cascade spraying at the same time, and a mixed gas of the high-temperature flue gas of the machine tail section and the flue gas of the ignition section and/or the heat preservation section with a temperature of no less than 120° C., an oxygen content of no less than 17%, and a $CO_2$ content and a water vapor content of no greater than 4% is introduced to the surface of the sintered material in the flue gas heating section, the water vapor is sprayed on the surface of the sintered material in the middle section in the manner of cascade spraying, a concentration in volume percent of the water vapor uniformly increases from 0.3-0.4% to 0.7-0.9% in a running direction of the sintering machine, and the second hydrogen-rich gas with a concentration in volume percent of 0.2-0.5% is sprayed on the surface the sintered material in the middle section.

2. The cooperative emission reduction method for the sintering using the energy-carrying composite gas medium according to claim 1, wherein the surface of the sintered material in the sintering machine is divided into an ignition section, a heat preservation section, a middle section, a flue gas heating section, and a machine tail section from a machine head to a machine tail.

3. The cooperative emission reduction method for the sintering using the energy-carrying composite gas medium according to claim 2, wherein a first hot exhaust gas is introduced to the surface of the sintered material in the ignition section for an ignition;

a composite gas of a second hot exhaust gas and a first hydrogen-rich gas is introduced to the surface of the sintered material in the heat preservation section; a composite gas of a second hydrogen-rich gas and water vapor is introduced to the surface of the sintered material in the middle section; and a first flue gas of the machine tail section and a second flue gas of the ignition section and/or the heat preservation section are introduced to the surface of the sintered material in the flue gas heating section.

4. The cooperative emission reduction method for the sintering using the energy-carrying composite gas medium according to claim 2, wherein the ignition section occupies a region of 1-2 air boxes of the machine head of the sintering machine; the heat preservation section occupies a region of ⅙-¼ of a total length of the sintering machine;

the middle section is a region from an end of heat preservation to a start of a flue gas heating up;

the flue gas heating section is a region from the start of the flue gas heating up to the flue gas reaching a highest temperature; and the machine tail section is a region of 2-3 air boxes at the machine tail of the sintering machine.

5. The cooperative emission reduction method for the sintering using the energy-carrying composite gas medium according to claim 4, wherein a first hot exhaust gas is introduced to the surface of the sintered material in the ignition section for an ignition;

a composite gas of a second hot exhaust gas and a first hydrogen-rich gas is introduced to the surface of the sintered material in the heat preservation section; a composite gas of a second hydrogen-rich gas and water vapor is introduced to the surface of the sintered material in the middle section; and a first flue gas of the machine tail section and a second flue gas of the ignition section and/or the heat preservation section are introduced to the surface of the sintered material in the flue gas heating section.

6. The cooperative emission reduction method for the sintering using the energy-carrying composite gas medium according to claim 1, wherein the second hydrogen-rich gas is a gas containing a hydrocarbon gas and/or a hydrogen gas.

7. The cooperative emission reduction method for the sintering using the energy-carrying composite gas medium according to claim 1, wherein the first hot exhaust gas and the second hot exhaust gas are produced by cooling sintered ore, or produced by combusting a blast furnace gas or a converter gas.

* * * * *